US009388066B2

(12) United States Patent
Anderson et al.

(10) Patent No.: US 9,388,066 B2
(45) Date of Patent: Jul. 12, 2016

(54) GLASS FORMING APPARATUS AND METHODS OF FORMING GLASS RIBBONS

(71) Applicant: Corning Incorporated, Corning, NY (US)

(72) Inventors: James Gary Anderson, Dundee, NY (US); Lewis Kirk Klingensmith, Corning, NY (US)

(73) Assignee: Corning Incorporated, Corning, NY (US)

( * ) Notice: Subject to any disclaimer, the term of this patent is extended or adjusted under 35 U.S.C. 154(b) by 22 days.

(21) Appl. No.: 14/284,480

(22) Filed: May 22, 2014

(65) Prior Publication Data

US 2014/0352356 A1 Dec. 4, 2014

Related U.S. Application Data

(60) Provisional application No. 61/829,535, filed on May 31, 2013.

(51) Int. Cl.
*C03B 17/06* (2006.01)
*C03B 23/037* (2006.01)

(52) U.S. Cl.
CPC ............. *C03B 17/068* (2013.01); *C03B 17/064* (2013.01); *C03B 23/037* (2013.01)

(58) Field of Classification Search
CPC .... C03B 17/068; C03B 17/064; C03B 23/037
See application file for complete search history.

(56) References Cited

U.S. PATENT DOCUMENTS 3,275,429 A * 9/1966 Javaux .................. C03B 17/064 264/175
4,612,030 A 9/1986 Smids .............................. 65/91
5,201,928 A 4/1993 Dicks et al. ..................... 65/106
5,545,245 A 8/1996 Mizusugi ........................ 65/273

(Continued)

FOREIGN PATENT DOCUMENTS

DE 1195022 B 6/1965 .............. C03B 17/00
JP 2008266070 A 11/2008 .............. C03B 17/06
WO 2009/009477 A1 1/2009

OTHER PUBLICATIONS

Database WPI Week 200877 Thomas Scientific, London, GB; AN 2008-N11801 XP002728620 & JP2008266070A (Nippon Electric Glass Co) Nov. 6, 2008.

(Continued)

*Primary Examiner* — Queenie Dehghan
(74) *Attorney, Agent, or Firm* — Matthew J. Mason; Stephen S. Wentsler

(57) ABSTRACT

Methods of forming a glass ribbon with a glass forming apparatus including a first glass roll device are disclosed. The methods include a step (I) of drawing the glass ribbon along a draw direction with the glass forming apparatus. Also included is a step (II) of adjusting a first roll member relative to a first support structure of the first glass roll device by translating the first roll member in a first linear direction parallel to a linear adjustment axis of the first support structure while the first roll member is adjustably mounted to the first support structure. Also included is a step (III) of contacting a first surface of the glass ribbon with the first roll member at a first adjusted contact location of the glass ribbon. Also disclosed are corresponding glass forming apparatus configured to form glass ribbons and draw the glass ribbons in a draw direction.

9 Claims, 10 Drawing Sheets

(56) References Cited

U.S. PATENT DOCUMENTS

| | | | | |
|---|---|---|---|---|
| 7,086,252 | B2 | 8/2006 | McMaster | 65/106 |
| 2005/0268655 | A1 | 12/2005 | Butts et al. | 65/29.12 |
| 2009/0107182 | A1 | 4/2009 | Anderson et al. | 65/90 |
| 2010/0292062 | A1 | 11/2010 | Neubauer | 492/49 |
| 2012/0144864 | A1 | 6/2012 | Tsuda et al. | 65/53 |

OTHER PUBLICATIONS

EPO International Search Report dated Sep. 2, 2014.

* cited by examiner 104
144
232a
232b
356b
356a
θ
196b
196a
268
344
332
208
384
192b
192a
188

GLASS FORMING APPARATUS AND METHODS OF FORMING GLASS RIBBONS

CROSS-REFERENCE TO RELATED APPLICATIONS

This application claims the benefit of priority under 35 U.S.C. §119 of U.S. Provisional Application Ser. No. 61/829,535 filed on May 31, 2013 the content of which is relied upon and incorporated herein by reference in its entirety.

FIELD

The present disclosure relates generally to glass forming apparatus and methods of forming glass ribbons with glass forming apparatus and, more particularly, to glass forming apparatus wherein a first roll member is configured to be adjusted relative to a first support structure and methods of forming a glass ribbon including the step of adjusting a first roll member relative to a first support structure.

BACKGROUND

In fusion processes for making a glass ribbon, such as those used to make glass sheets for liquid crystal displays (LCDs), glass roll members contact the glass ribbon at various stages of the processes and at various glass contact locations.

SUMMARY

In a first aspect of the disclosure, a method of forming a glass ribbon with a glass forming apparatus including a first glass roll device is disclosed herein. The method includes a step (I) of drawing the glass ribbon along a draw direction with the glass forming apparatus. The method also includes a step (II) of adjusting a first roll member relative to a first support structure of the first glass roll device by translating the first roll member in a first linear direction parallel to a linear adjustment axis of the first support structure while the first roll member is adjustably mounted to the first support structure. The method also includes a step (III) of contacting a first surface of the glass ribbon with the first roll member at a first adjusted contact location of the glass ribbon.

In an example of the first aspect, step (III) contacts the first surface including a first major surface of the glass ribbon.

In another example of the first aspect, the first linear direction is transverse to the draw direction.

In another example of the first aspect, the first linear direction is vertically down-tilted with respect to the draw direction.

In another example of the first aspect, the first glass roll device includes a second roll member. In accordance with this example, step (II) includes adjusting the second roll member relative to the first support structure such that the second roll member translates relative to the first support structure in the first linear direction. Also, step (III) includes contacting the first surface including a first major surface of the glass ribbon with the first roll member and contacting a second major surface of the glass ribbon with the second roll member.

In another example of the first aspect, step (I) includes contacting the first surface of the glass ribbon with the first roll member at an initial contact location of the glass ribbon. For example, step (II) can include continuously contacting the first surface of the glass ribbon with the first roll member while translating the first roll member along the first linear direction from a first orientation wherein the first roll member contacts the initial contact location to a second orientation wherein the first roll member contacts the first adjusted contact location.

In another example of the first aspect, the glass ribbon is being drawn continuously during steps (I), (II), and (III).

In another example of the first aspect, the first roll member includes a driven roll member. Also in accordance with this example, step (III) includes stretching the glass ribbon with the driven roll member to reduce a thickness of the glass ribbon.

In another example of the first aspect, the first roll member includes an idle roll member. Also in accordance with this example, step (III) includes pinching the glass ribbon at an edge bead of the glass ribbon with the idle roll member In another example of the first aspect, step (II) includes linearly sliding the first roll member relative to the first support structure.

In another example of the first aspect, the glass forming apparatus includes a second glass roll device. Also in accordance with this example, step (II) includes adjusting a first cross roll member relative to a first cross support structure of the second glass roll device by translating the first cross roll member in a first cross linear direction parallel to a linear cross adjustment axis of the first cross support structure while the first cross roll member is adjustably mounted to the first cross support structure. Also, step (III) further includes contacting the first surface of the glass ribbon with the first cross roll member at a first cross adjusted contact location of the glass ribbon.

The first aspect can be carried out alone or with one or any combination of examples of the first aspect discussed above.

In a second aspect of the disclosure, a glass forming apparatus configured to form a glass ribbon and draw the glass ribbon in a draw direction is disclosed herein. The glass forming apparatus includes a first glass roll device. The first glass roll device includes a first support structure and a first roll member adjustably attached to the first support structure. The first roll member is configured to be adjusted by translating the first roll member relative to the first support structure in a first linear direction parallel to a linear adjustment axis of the first support structure while the first roll member is adjustably mounted to the first support structure.

In an example of the second aspect, the first glass roll device includes a support shaft attached to the first roll member. In accordance with this example, the support shaft provides a cantilever support for the first roll member.

In another example of the second aspect, the first glass roll device includes a motor configured to rotate the first roll member.

In another example of the second aspect, the glass forming apparatus further includes an adjustment apparatus adjustably attaching the first roll member to the first support structure. In one example, the adjustment apparatus includes an adjustment port configured to be externally interfaced with a tool to provide adjustment of the first roll member relative to the first support structure. In another example, the adjustment apparatus includes a tongue slidably received by a groove extending in the first linear direction.

In another example of the second aspect, the first glass roll device includes a second roll member configured to translate relative to the first support structure in the first linear direction.

In another example of the second aspect, the apparatus further includes a second glass roll device. The second glass roll device includes a first cross support structure and a first cross roll member adjustably attached to the first cross support structure. The first cross roll member is configured to be adjusted by translating the first cross roll member relative to the first cross support structure in a second direction parallel to a linear cross adjustment axis of the first cross support structure while the first cross roll member is adjustably mounted to the first cross support structure.

The second aspect can be carried out alone or with one or any combination of examples of the second aspect discussed above.

BRIEF DESCRIPTION OF THE DRAWINGS

These and other features, aspects and advantages of the claimed invention are better understood when the following detailed description is read with reference to the accompanying drawings, in which:

DETAILED DESCRIPTION

Figure 1:
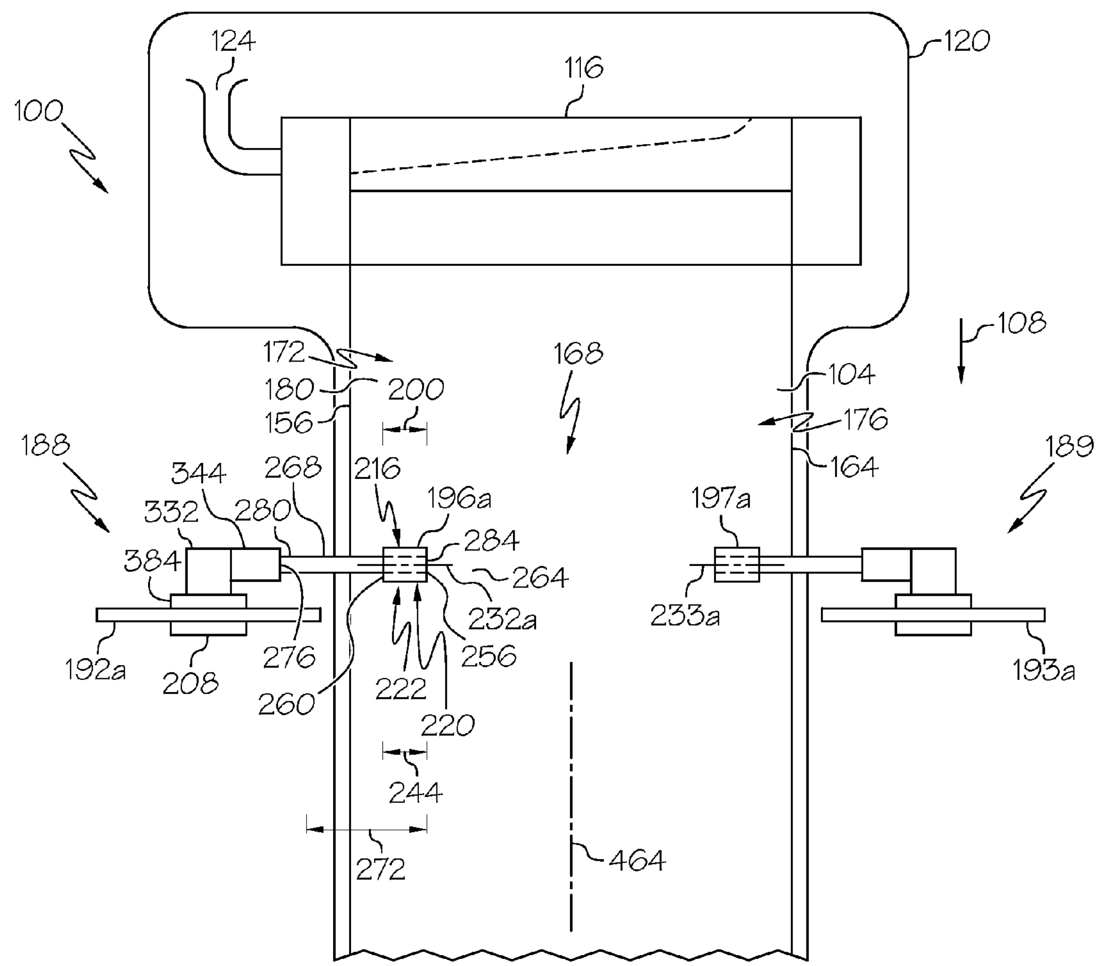
FIG. 1 is an example glass forming apparatus in accordance with the disclosure.

Aspects of the claimed invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

Figure 2:
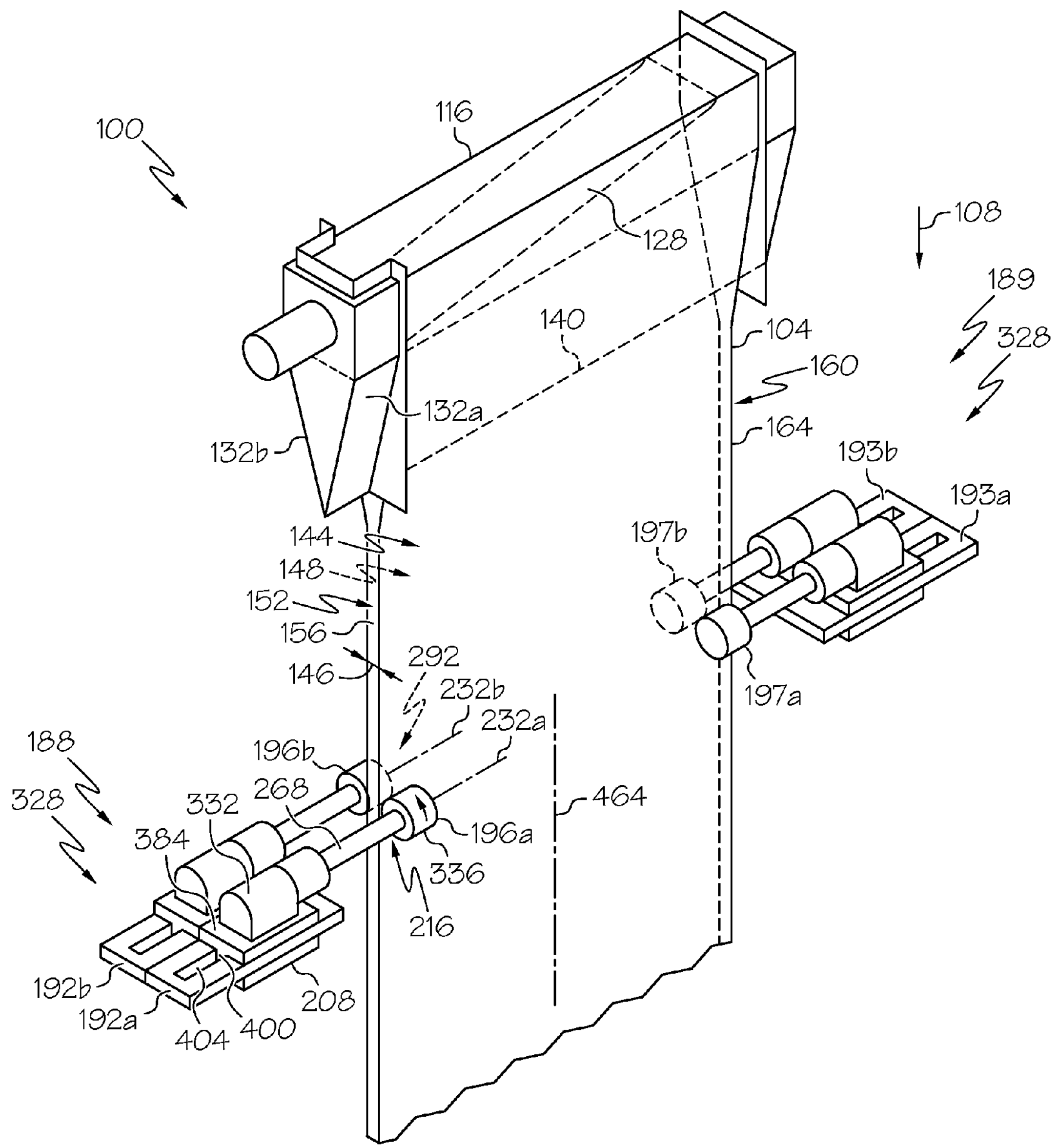
FIG. 2 is a perspective view of portions of the glass forming apparatus of FIG. 1 including example glass roll devices that include driven roll members.

Referring now to FIG. 1, example glass forming apparatus 100 of the disclosure will be described in more detail. The glass forming apparatus 100 can be configured to form a glass ribbon 104, for example, by fusion drawing the glass ribbon 104 in a draw direction 108. As shown in FIG. 1, in accordance with a fusion process, molten glass can be prepared and delivered to an inlet 124 of a forming device 116. Turning to FIG. 2, the molten glass can flow into a trough 128, overflow and run down a first side 132*a* and a second side 132*b* of the forming device 116, and rejoin at a root 140 of the forming device 116, to initially form a glass ribbon 104. The glass ribbon 104 can have a first major surface 144 and a second major surface 148 opposite the first major surface 144. The glass ribbon 104 can further include a first edge surface 152 intersecting the first major surface 144 and the second major surface 148 on a first side 156 of the glass ribbon 104. Likewise, the glass ribbon 104 can include a second edge surface 160 opposing the first edge surface 152 and intersecting the first major surface 144 and the second major surface 148 on a second side 164 of the glass ribbon 104.

Returning to FIG. 1, the glass ribbon 104 also can have a quality area 168, corresponding to a portion of the glass ribbon 104, e.g. a central portion, that is intended to become part of a final product, such as a glass sheet. The glass ribbon 104 can also have a first contact surface 172 and a second contact surface 176 of respective edge portions of the glass ribbon 104 that are not intended to become part of the final product. In one example, the edge portions can include an edge bead 180 of the glass ribbon 104 that will be cut and removed from the glass ribbon 104. Once initially formed, the glass ribbon 104 can be drawn away from the forming device 116 along a draw direction 108.

As shown in FIG. 1, the glass forming apparatus 100 can include a first glass roll device 188. The first glass roll device 188 can be positioned, for example, near the first side 156 of the glass ribbon 104. The first glass roll device 188 can include a first support structure 192*a* and a first roll member 196*a*, adjustably attached to the first support structure 192*a*.

Examples of the first roll member 196*a* can be fabricated from a glass contact material, such as a ceramic material. The ceramic material can be one that withstands high temperatures associated with processes for manufacturing glass ribbons 104, e.g. temperatures at which a glass ribbon 104 can be drawn, temperatures associated with the inside of a fusion forming process enclosure of a glass forming apparatus 100, and the like. The glass contact material can be in the form of a single part, e.g. a monolith, or a plurality of parts, e.g. discs compressed together into a cartridge. As shown in FIG. 1, the first roll member 196*a* can have an axial length 200, with respect to the axial centerline 232*a* of the first roll member 196*a*. Although various axial lengths can be provided depending on the particular application, in some examples, the axial length 200 can be from about 10 mm to about 250 mm, such as from about 20 mm to about 125 mm, such as from about 25 mm to about 50 mm.

The first support structure 192*a* can be, for example, a plate, a platform, a brace, a bracket, or the like. As shown in FIG. 1, the first support structure 192*a* can be attached to a first mounting surface 208 of the glass forming apparatus 100. The attachment of the first support structure 192*a* to the first mounting surface 208 can, in some examples, ensure that the first support structure 192*a* maintains a fixed position relative to the first mounting surface 208, and thus relative to the glass forming apparatus 100 and/or the glass ribbon 104, during use of the glass forming apparatus 100.

Turning to FIG. 2, the first glass roll device 188 can be positioned such that the first roll member 196*a* contacts a first surface of the glass ribbon 104, e.g. a first major surface 144 of the glass ribbon 104, at a first contact location 216 of the glass ribbon 104, during formation and drawing of the glass ribbon 104. The contact can be, for example, constant or intermittent. Moreover, the first roll member 196*a* can rotate about its axial centerline 232*a*, for example during contact with the first surface of the glass ribbon 104 while drawing the glass ribbon 104 along the draw direction 108.

Figure 3:
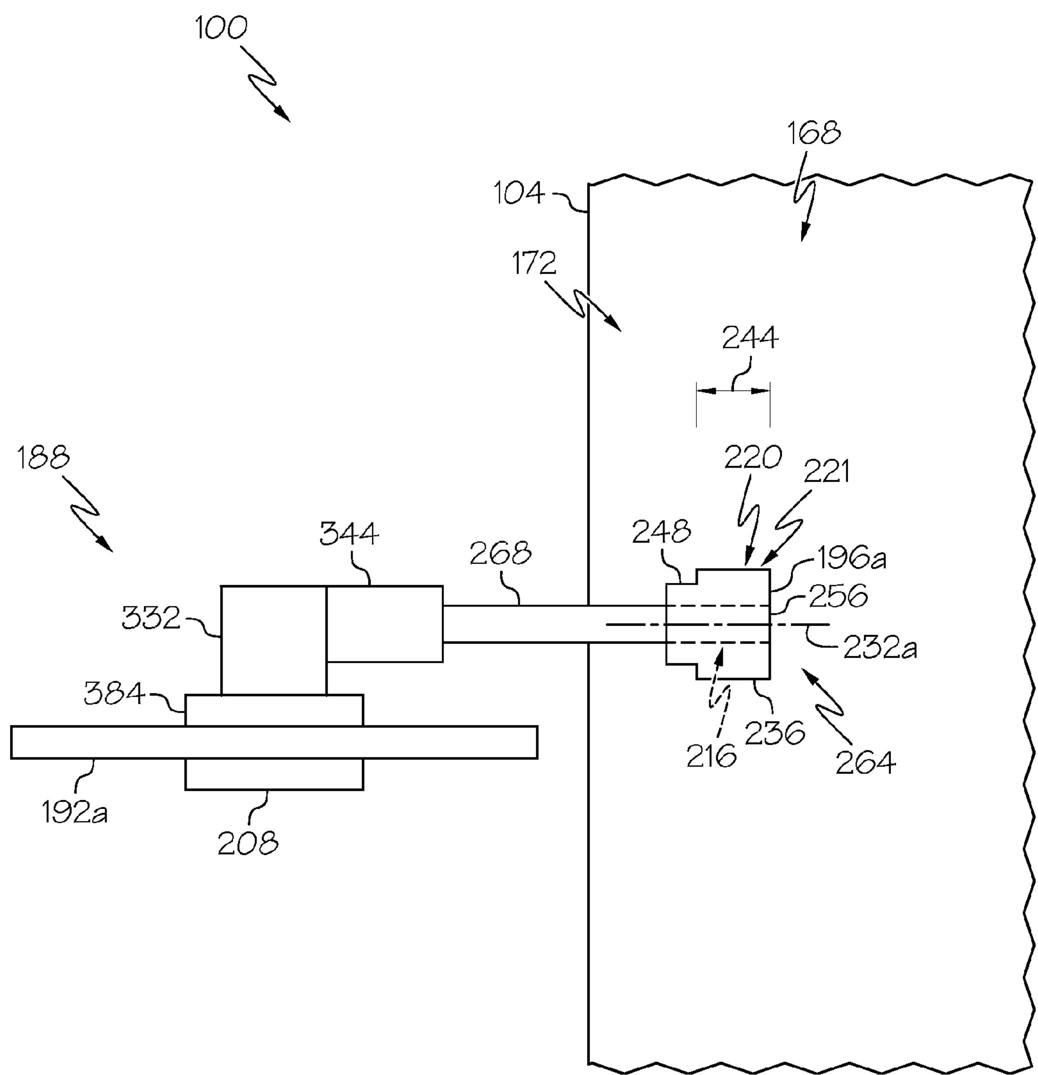
FIG. 3 is a front view of an example glass roll device of FIG. 2 including a roll member that includes a pulling flat location that is co-terminal with a distal end of the roll member.

Considering the first roll member 196*a* in more detail, as shown in FIG. 3 the first roll member can include a first pulling flat location 220. The first pulling flat location 220 corresponds to a surface of the first roll member 196*a* that is intended to contact the first surface of the glass ribbon 104, e.g. the first major surface 144 at the first contact location 216 of the glass ribbon 104. The first pulling flat location 220 can have profile 236, e.g. being parallel or angled with respect to the axial centerline 232*a* of the first roll member 196*a*, so that it can achieve a complementary fit with the first surface of the glass ribbon 104, e.g. at the first contact location 216 of the glass ribbon 104. The first roll member 196*a* can be machined to form the first pulling flat location 220 and the profile 236 thereof, for example by machining the first roll member 196*a* to have the desired profile 236 along the first pulling flat location 220, as well as by machining any portions 248 of the first roll member 196*a* outside of the first pulling flat location 220, e.g. to be recessed in comparison to the profile 236 of the first pulling flat location 220.

Exemplary first pulling flat locations 220 include a first pulling flat location 221, as shown in FIG. 3, that is co-terminal with a distal end 256 of the first roll member 196*a*, and a first pulling flat location 222, as shown in FIG. 1, that is co-terminal with a proximal end 260 and a distal end 256 of the first roll member 196*a*, among others. As will be apparent from FIG. 3, during methods for manufacturing a glass ribbon 104, a first roll member 196*a* including a first pulling flat location 221 that is co-terminal with a distal end 256 of the first roll member 196*a* will not overhang any portion 264 of the glass ribbon 104 distal to the first contact location 216 of the glass ribbon 104. Thus, to the extent that the first contact location 216 of the glass ribbon 104 corresponds to a first contact surface 172 of the glass ribbon 104, a first roll member 196*a* having such a first pulling flat location 221 will not overhang a quality area 168 of the glass ribbon 104. Moreover, as will be apparent from FIG. 1, during methods for manufacturing a glass ribbon 104, a first roll member 196*a* including a first pulling flat location 222 that is co-terminal with a proximal end 260 and a distal end 256 of the first roll member 196*a* also will not include excess glass contact material beyond the first pulling flat location 222, i.e. will be a first roll member 196*a* that is not over-sized. As shown in FIG. 1 and FIG. 3, the first pulling flat location 220 can have a length 244, with respect to an axial centerline 232*a* of the first roll member 196*a*. While various lengths may be provided, in some examples, the length 244 can be from about 10 mm to about 100 mm, such as from about 20 mm to about 75 mm, such as from about 25 mm to about 50 mm.

Considering the first glass roll device 188 in more detail, with reference to FIG. 1, the first glass roll device 188 can include a support shaft 268 attached to the first roll member 196*a*. For example, the first roll member 196*a* can be mounted on the support shaft 268, e.g. along all or part of a length 272 of the support shaft 268 and coaxial thereto. The support shaft 268 can be made, for example, from a metal or other material configured to withstand temperatures at which a glass ribbon 104 can be drawn, temperatures associated with the inside of a fusion forming process enclosure of a glass forming apparatus 100, and the like, while providing sufficient support for the first roll member 196*a*.

As shown in FIG. 1, the support shaft 268 can provide a cantilever support 276 for the first roll member 196*a*. The support shaft 268 can be attached, for example, to a spindle 344 at a cantilevered end 280 of the support shaft 268, thus providing the cantilever support 276. Moreover, the first roll member 196*a* can be mounted on the support shaft 268 such that, for example, the first roll member 196*a* and the first support shaft 268 are co-terminal. Thus, for example, the first roll member 196*a* can be positioned at roll-member end 284 of the support shaft 268, opposite the cantilevered end 280 of the support shaft 268, such that the roll-member end 284 of the support shaft 268 does not extend beyond the first roll member 196*a*. During methods for manufacturing a glass ribbon 104, such a support shaft 268, providing cantilever support 276 and having a first roll member 196*a* mounted thereon and being co-terminal therewith, also will not overhang any portion 264 of the glass ribbon 104 distal to the first contact location 216 of the glass ribbon 104. Thus, to the extent that the first contact location 216 of the glass ribbon 104 corresponds to a first contact surface 172 of the glass ribbon 104, the support shaft 268 will not overhang a quality area 168 of the glass ribbon 104. Also for example, the cantilever support 276 can be rigid, thereby minimizing unintended translation and/or pivoting of the first roll member 196*a* with respect to the first support structure 192*a*, and thus minimizing unintended translation and/or pivoting of the first roll member 196*a* with respect to the glass forming apparatus 100 and/or the glass ribbon 104 and maintaining the orientation of the first roll member 196*a* with respect to the first contact location 216 of the glass ribbon 104.

As shown in FIG. 2, the first glass roll device 188 can also include a second roll member 196*b*, as described above. Unless otherwise indicated, the second roll member 196*b* may be substantially identical to the first roll member 196*a* although different configurations may be provided in further examples. In some configurations, the first glass roll device 188 also can be positioned such that the second roll member 196*b* contacts the second major surface 148 of the glass ribbon 104, opposite the first major surface 144, at a second contact location 292 of the glass ribbon 104. As with the first roll member 196*a*, the second roll member 196*b* can likewise constantly or intermittently contact the glass ribbon and may rotate about its axial centerline 232*b*, thereby drawing the glass ribbon 104 along the draw direction 108. The first glass roll device 188 can be positioned, for example, such that the first roll member 196*a* and the second roll member 196*b* of the first glass roll device 188 exhibit bilateral symmetry across a plane located midway between the first major surface 144 and the second major surface 148 of the glass ribbon 104, although different positions can also be used. The first glass roll device 188 also can include additional roll members, e.g. a third roll member, a fourth roll member, etc., also contacting the first major surface 144 or the second major surface 148 of the glass ribbon 104, and rotating about their axial centerlines, thereby also drawing the glass ribbon 104 along the draw direction 108.

As shown in FIG. 2, the glass forming apparatus 100 also can include a second glass roll device 189 that, in some examples, may be substantially identical to the first glass roll device 188 although different configurations may be provided in further examples. As shown, the second glass roll device 189 can be an identical mirror image of the first glass roll device 188. Indeed, the second glass roll device 189 may be positioned near the second side 164 of the glass ribbon 104, across a centerline 464 of the glass ribbon 104 with respect to the first glass roll device 188. The second glass roll device 189 can include a first cross roll member 197*a* in contact with the first major surface 144 of the glass ribbon 104, and optionally a second cross roll member 197*b* in contact with the second major surface 148 of the glass ribbon 104. The first glass roll device 188 and the second glass roll device 189 can be positioned such that the first roll member 196*a* and the first cross roll member 197*a* of each exhibit bilateral symmetry across a plane transverse to the glass ribbon 104 and intersecting the centerline 464 of the glass ribbon 104. In addition, as shown the second roll member 196*b* and the second support structure 192*b* can exhibit bilateral symmetry with the second cross roll member 197*b* and a second cross support member 193*b*. Different positions can also be used. The glass forming apparatus 100 also can include additional glass roll devices, e.g. a third glass roll device, a fourth glass roll device across from the third glass roll device, etc., also exhibiting such bilateral symmetry.

The first glass roll device 188, alone or paired with a second glass roll device 189 across from the first glass roll device 188, and the potential additional glass roll devices, can be used, for example, to pull, convey, and/or guide the glass ribbon 104 along the glass forming apparatus 100 during the process of manufacturing the glass ribbon 104, thereby determining the draw direction 108 of the glass forming apparatus 100, as well as to control the stress and/or the shape of the glass ribbon 104 during the process, thereby determining physical attributes of the glass ribbon 104 and products, such as LCD glass sheets, to be made from the glass ribbon 104.

With respect to a fusion process in particular, as shown in FIG. 1 the first roll member 196*a* of the first glass roll device 188 can be, for example, an internal roll member, i.e. a first roll member 196*a* positioned internal to a fusion forming process enclosure as described above, such that the first roll member 196*a* contacts the first surface of the glass ribbon 104 internally with respect to a fusion forming process enclosure 120. Alternatively, the first glass roll member 196*a* can be, for example, an external roll member, i.e. a first roll member 196*a* positioned external to a fusion forming process enclosure 120, such that the first roll member 196*a* contacts the first surface of the glass ribbon 104 externally with respect to the fusion forming process enclosure 120. Likewise, a second roll member 196*b* of the first glass roll device 188, and a first cross roll member 197*a* and a second cross roll member 197*b* of a second glass roll device 189, as well as potential additional roll members of these and additional glass roll devices, also can be internal roll members or external roll members, depending on their positions relative to the fusion forming process enclosure 120.

As shown in FIG. 2, the first glass roll device 188 also can be for example, a driven glass roll device 328, e.g. a first glass roll device 188 that is driven by a motor 332. A driven glass roll device 328 can include, for example, a first roll member 196*a* and optionally a second roll member 196*b*, at least one of which is driven, i.e. a driven roll member 336. Thus, for example, the first glass roll device 188 can include a motor 332 configured to rotate the first roll member 196*a* about the axial centerline 232*a* of the first roll member 196*a*, and thus can be a driven glass roll device 328. The motor 332 can be, for example, a servo motor, which optionally can use a gear box, as well as a spindle and associated bearings, in driving the first roll member 196*a*. Such a servo motor can, for example, provide torque and/or speed measurements, which can be used to control operation of the servo motor and others. Other types of motors 332 and/or other approaches for control can also be used. Specific examples of a driven glass roll device 328 include a first glass roll device 188 including a first roll member 196*a* and a second roll member 196*b*, in which both the first roll member 196*a* and the second roll member 196*b* are driven by a motor 332, i.e. both are driven roll members 336, as well as a first glass roll device 188 including a first roll member 196*a* and a second roll member 196*b*, in which the first roll member 196*a*, but not the second roll member 196*b*, is driven by a motor 332, i.e. only the first roll member 196*a*, not the second roll member 196*b*, is a driven roll member 336, among others. A driven glass roll device 328 can be positioned across from another driven glass roll device 328, e.g. symmetrically, and/or internally or externally, as described above. A driven glass roll device 328 can be used for example, to impart stretching force on a glass ribbon 104 being drawn by the glass forming apparatus 100, based on the speed and/or orientation of the corresponding driven roll member 336. Thus, a driven glass roll device 328, including a driven roll member 336 thereof, can be used, for example, to stretch the glass ribbon 104 to a final thickness 146, between the first major surface 144 and the second major surface 148 of the glass ribbon 104, during manufacture.

Figure 4:
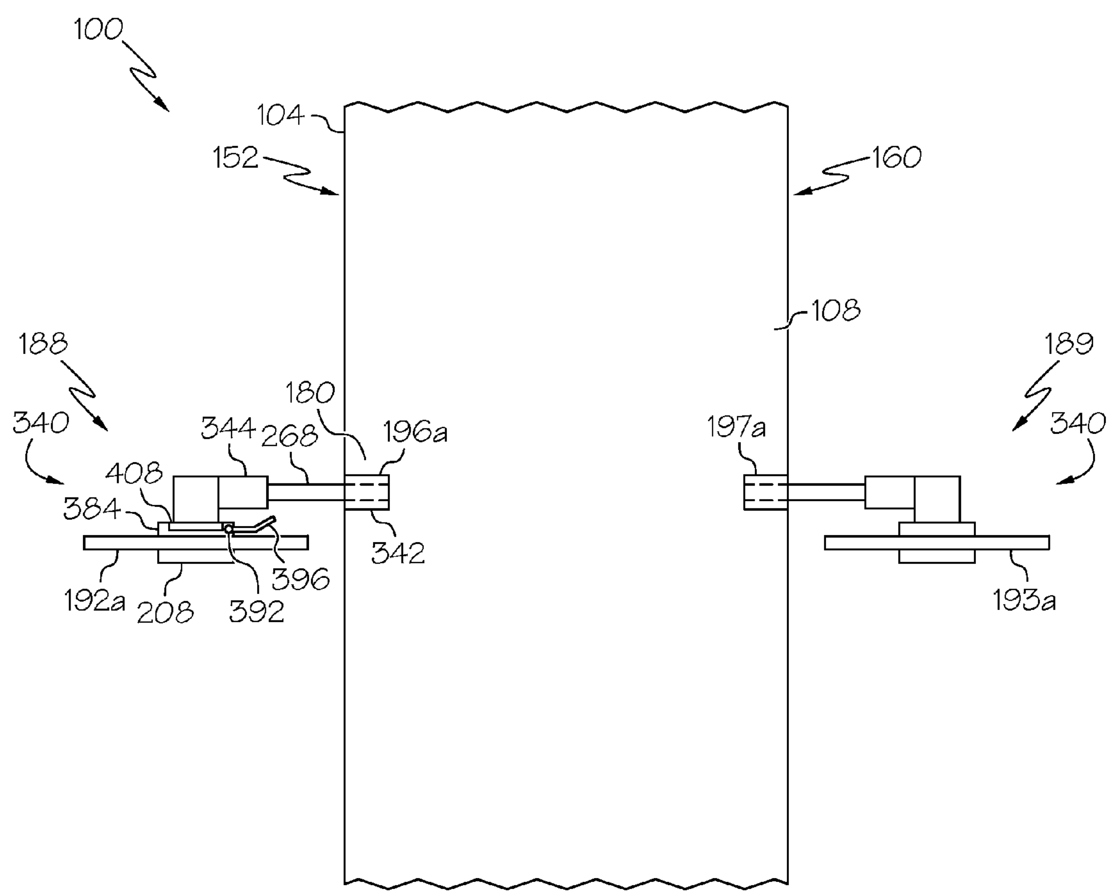
FIG. 4 is a front view of portions of a glass forming apparatus wherein the glass roll devices include idle roll members.

As shown in FIG. 4, the first glass roll device 188 also can be, for example, an idle glass roll device 340, e.g. a first glass roll device 188 that is not driven by a motor 332. An idle glass roll device 340 can have, for example, a first roll member 196*a* and optionally a second roll member 196*b*, wherein both roll members comprise idle roll members 342 that are not driven by a motor to rotate to draw the glass ribbon in the draw direction 108. Thus, for example, the first glass roll device 188 can lack a motor 332 configured to rotate any glass roll member thereof, and thus can be an idle glass roll device 340. An idle glass roll device 340 also can be positioned across from another idle glass roll device 340, e.g. symmetrically, and/or internally or externally, as described above. An idle glass roll device 340, including an idle roll member 342 thereof, can be used, for example, to impart pinching force on the glass ribbon 104, for example to control thickness 146 of the glass ribbon 104 at or near the first edge surface 152 of the glass ribbon 104 and/or at or near the second edge surface 160 of the glass ribbon 104. Thus, for example, an idle glass roll device 340 can be used to shape an edge bead 180 of the glass ribbon 104.

Figure 5:
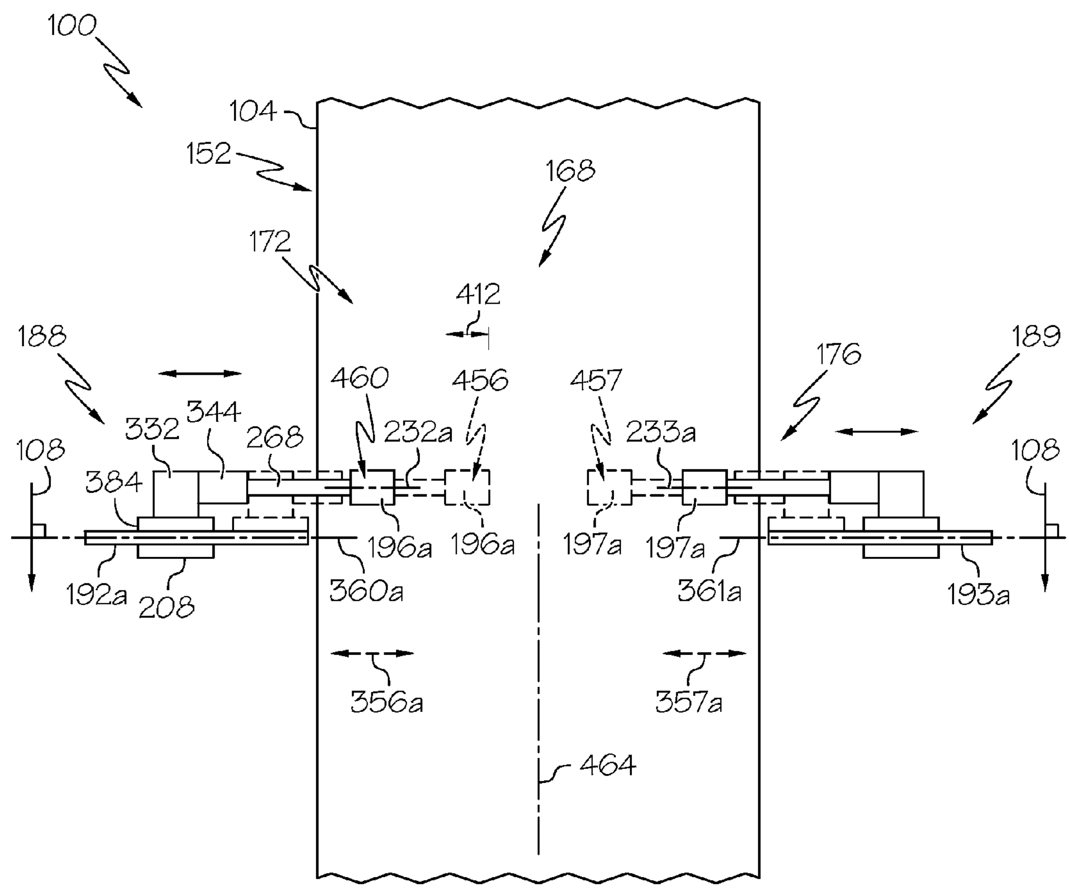
FIG. 5 is a front view of example glass roll devices of FIG. 2, illustrating translation of the example glass roll devices.

As noted above, the first roll member 196*a* can be adjustably attached to the first support structure 192*a*. For example, as shown in FIG. 5, the first roll member 196*a* can be attached to the first support structure 192*a*, such that the first roll member 196*a* is fixed in position relative to the first support structure 192*a*, though in a manner that is adjustable, e.g. such that the attachment of the first roll member 196*a* to the first support structure 192*a* can be reversed, with the result that the first roll member 196*a* is released to move relative to the first support structure 192*a* while still being adjustably mounted to the first support structure 192*a*. Thus, for example, while being fixedly attached, the first roll member 196*a* can be locked from translating relative to the first support structure 192*a* due to the fixed attachment between the first roll member 196*a* and the first support structure 192*a*. Also, the fixed attachment can be selectively released to allow adjustment of the first roll member 196*a* with respect to the first support structure 192*a* and may therefore be configured to permit the first roll member 196*a* to translate relative to the first support structure 192*a* while being adjustably mounted to the first support structure 192*a*. In one example, the adjustable mount between the first roll member 196*a* and the first support structure 192*a* can provide linear translation with one degree of freedom. The adjustable attachment can be based, for example, on use of a clamp, a screw, a lock, or the like, that can be operated to attach the first roll member 196*a* to the first support structure 192*a*, and that can be locked to fixedly attach the first roll member 196*a* to the first support structure 192*a* or unlocked to permit adjustment of the first roll member 196*a* relative to the first support structure 192*a*.

As shown in FIG. 1, the attachment can also be accomplished indirectly, for example based on attachment of the first roll member 196*a* to the first support structure 192*a* through one or more connecting parts, such as the support shaft 268, the spindle 344, the motor 332, and an attachment apparatus 384, e.g. in that order, among other potential connecting parts and potential configurations thereof. The attachment also can be accomplished manually, e.g. by manually clamping, screwing, locking, or otherwise attaching the first roll member 196*a* to the first support structure 192*a*, or automatically, e.g. by using a machine to accomplish the attachment. Likewise, reversal of the attachment can be accomplished manually or automatically. Moreover, a second roll member 196*b* of the first glass roll device 188, and a first cross roll member 197*a* and a second cross roll member 197*b* of a second glass roll device 189, as well as potential additional roll members of these and additional glass roll devices, also can be similarly configured for indirect attachment.

As will be appreciated by reference to FIG. 5, when the first roll member 196*a* is fixedly attached to the first support structure 192*a* and the first support structure 192*a* is fixedly attached to the first mounting surface 208 of the glass forming apparatus 100, the first roll member 196*a* can be incapable of translating, not only relative to the first support structure 192*a*, but also relative to the first mounting surface 208 and thus relative to the glass forming apparatus 100 and/or the glass ribbon 104, and thus can maintain tight machine tolerances. As will also be appreciated, when attachment of the first roll member 196*a* to the first support structure 192*a* is reversed while the first support structure 192*a* is attached to a first mounting surface 208 of the glass forming apparatus 100, the first roll member 196*a* can be configured to translate, not only relative to the first support structure 192*a*, but also relative to the first mounting surface 208 and thus relative to the glass forming apparatus 100 and/or the glass ribbon 104, again for example with one translational degree of freedom. In this way, the position of the first roll member 196*a* can be adjusted, not only with respect to the first support structure 192*a*, but also with respect to the glass forming apparatus 100 and/or the glass ribbon 104 during the process.

Figure 6:
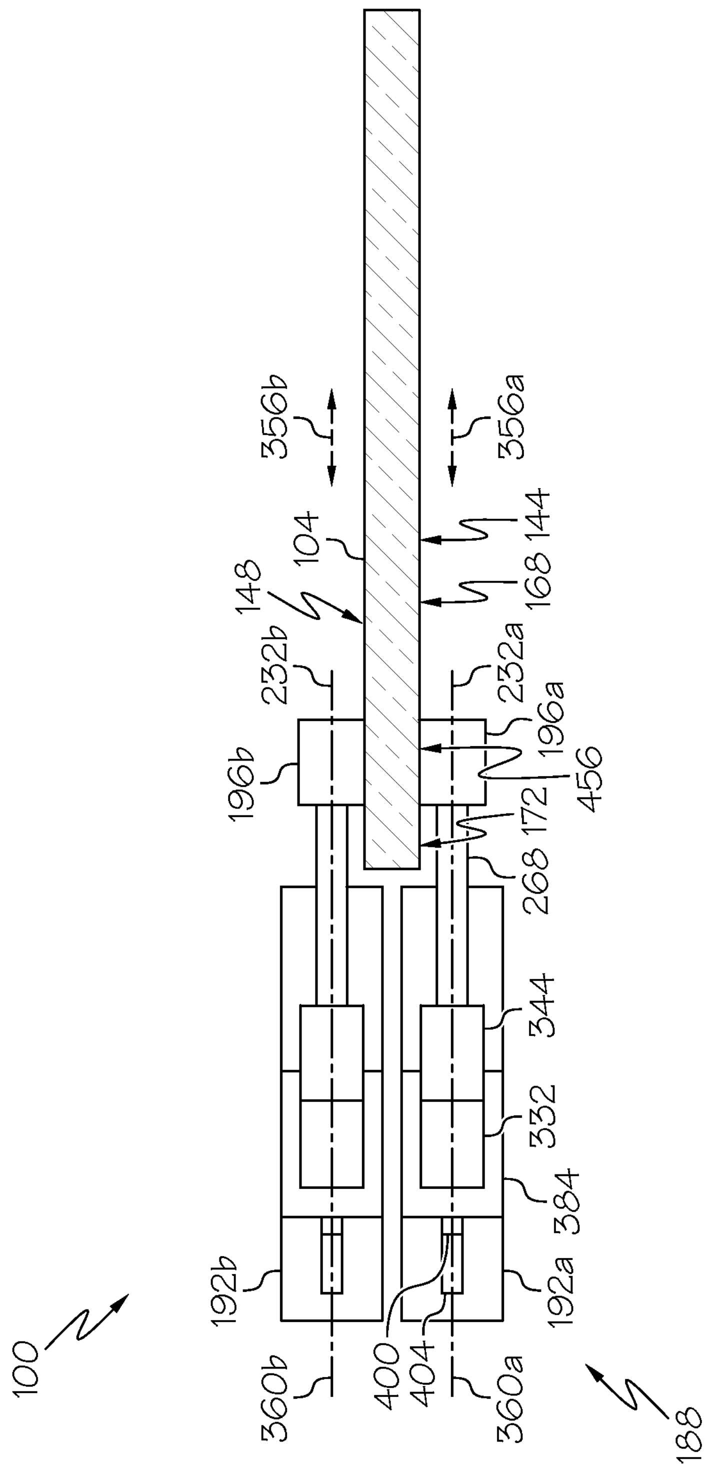
FIG. 6 is a top view of an example glass roll device of FIG. 2.

As shown in FIG. 5, the first roll member 196*a* can be configured to be adjusted by translating the first roll member 196*a* relative to the first support structure 192*a* in first linear directions 356*a* parallel to a linear adjustment axis 360*a* of the first support structure 192*a* while the first roll member 196*a* is adjustably mounted to the first support structure 192*a*. As shown in FIG. 6, the linear adjustment axis 360*a* of the first support structure 192*a* can be determined, for example, by a linear groove, a linear track, a linear ridge, or the like, that is included in the first support structure 192*a* and that is oriented in the first linear direction 356*a* parallel to linear adjustment axis 360*a* of the first support structure 192*a*, and to which the first roll member 196*a* and/or connecting part, e.g. adjustment apparatus 384, fits complementarily. The first roll member 196*a* can be configured to be adjusted by translating the first roll member 196*a* relative to the first support structure 192*a* in the linear adjustment axis 360*a* of the first support structure 192*a*, for example when attachment of the first roll member 196*a* to the first support structure 192*a* has been reversed and thus while the first roll member 196*a* is not attached to the first support structure 192*a*, but is still adjustably mounted to the first support structure 192*a*. The translation of the first roll member 196*a* relative to the first support structure 192*a* can be based, for example, on sliding, shifting, or the like, manually or automatically. The first roll member 196*a* can be adjustably mounted to the first support structure 192*a* during the translation, for example such that the first roll member 196*a* can translate relative to the first support structure 192*a* along the first linear directions 356*a*, e.g. forward or backward, without translating in other directions, i.e. with only one translational degree of freedom. The adjustable mounting also can be based, for example, on the first roll member 196*a* and/or connecting part, e.g. adjustment apparatus 384, fitting complementarily to the first support structure 192*a*, as described above. Following the translation, the first roll member 196*a* can be reattached to the first support structure 192*a* again, to restore adjustable attachment thereof, as described above. As shown in FIG. 5, the first roll member 196*a* can be configured to be adjusted by translating the first roll member 196*a* relative to the first support structure 192*a* in first linear directions 356*a* parallel to the linear adjustment axis 360*a* of the first support structure 192*a* a distance 412 of, for example, from about 10 mm to about 250 mm, such as from about 20 mm to about 125 mm, such as from about 25 mm to about 50 mm. The first roll member 196*a* also can be configured such that the adjustment, including reversal of attachment, translation, and reattachment, can be accomplished, for example, within a few minutes, e.g. manually, or within a few seconds, e.g. automatically. Cycles of attachment and adjustment can be carried out and repeated as needed, for example for determining optimal contact locations of the glass ribbon 104 during methods of forming the glass ribbon 104, and for adjusting the contact locations of the glass ribbon 104 as needed as process conditions change.

The linear adjustment axis 360*a* of the first support structure 192*a* can have an orientation with respect to the draw direction 108. In various examples, the linear adjustment axis of the first support structure can be transverse to the draw direction. For example, as shown in FIG. 5, the linear adjustment axis 360*a* of the first support structure 192*a* can be transverse to the draw direction 108 with the linear adjustment axis 360*a* being substantially perpendicular to the draw direction 108. Also, as shown for example in FIG. 7, the linear adjustment axis 360*a* can be transverse to the draw direction by being downwardly angled relative to the draw direction. Indeed, as shown, the linear adjustment axis 360*a* of the first support structure 192*a* can be vertically down-tilted at an angle $\alpha$ with respect to the draw direction 108, e.g. angled downwardly and transverse to the draw direction 108. The angle $\alpha$ of vertical down-tilt can be, for example, from about 0.1 degrees to about 10 degrees, such as from about 0.2 degrees to about 5 degrees, such as from about 0.3 degrees to about 3 degrees although other angles may be provided.

The linear adjustment axis 360*a* of the first support structure 192*a* also can have an orientation with respect to the first surface of the glass ribbon 104. For example, as shown in FIG. 6, the linear adjustment axis 360*a* of the first support structure 192*a* can be parallel to the first surface of the glass ribbon 104, e.g. the first major surface 144 of the glass ribbon 104.

Figure 7:
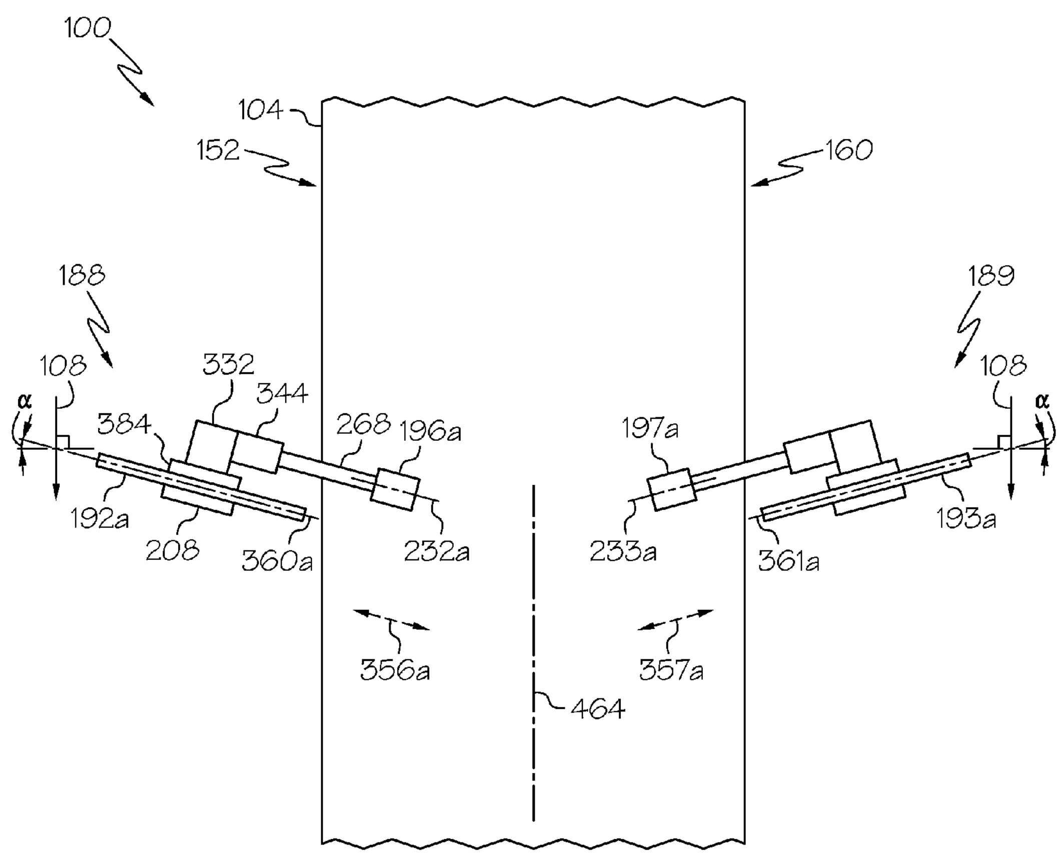
FIG. 7 is a front view of example glass roll devices of FIG. 2 that include support structures and roll members that are down-tilted.

Accordingly, with reference to FIGS. 5-7, the first linear direction 356*a* can also be, for example, transverse to the draw direction 108 while being substantially perpendicular to the draw direction or oriented at another angle such that the first linear direction is vertically down-tilted at an angle $\alpha$ with respect to the draw direction 108, and/or parallel to the first surface of the glass ribbon 104. Likewise, the first roll member 196*a* can be adjusted by translating the first roll member 196*a* relative to the first support structure 192*a*, for example, perpendicular or vertically down-tilted at an angle $\alpha$ with respect to the draw direction 108, and/or parallel to the first surface of the glass ribbon 104, among other possible orientations. Moreover, a second roll member 196*b* of the first glass roll device 188, and a first cross roll member 197*a* and a second cross roll member 197*b* of a second glass roll device 189, as well as potential additional roll members of these and additional glass roll devices, also can be similarly oriented and adjusted. Vertical down-tilting of the first roll member 196*a*, and others, can provide cross-ribbon tensioning, which can improve process stability, product flatness, and/or product stress.

The axial centerline 232*a* of the first roll member 196*a* can have an orientation with respect to the linear adjustment axis 360*a* of the first support structure 192*a*. Thus, for example, as shown in FIGS. 5-7, the axial centerline 232*a* of the first roll member 196a can be parallel to the linear adjustment axis 360a of the first support structure 192a, in which case adjustment of the first roll member 196a as described above results in adjustment of the first roll member 196a in the first linear direction 356a along axial centerline 232a of the first roll member 196a, again perpendicular or vertically down-tilted at an angle α with respect to the draw direction 108, and/or parallel to the first surface of the glass ribbon 104, depending on the orientation of the linear adjustment axis 360a of the first support structure 192a as described above.

Figure 8:
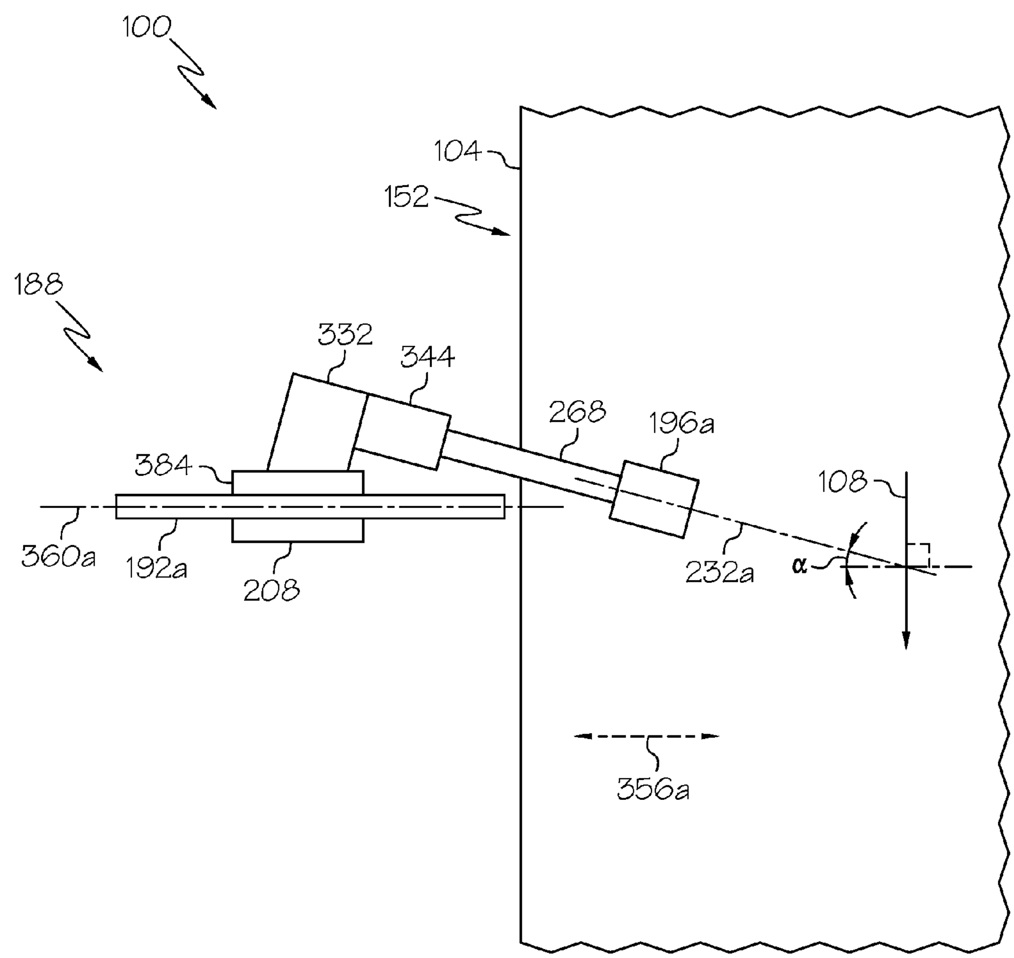
FIG. 8 is a front view of example glass roll devices of FIG. 2 that include roll members that are down-tilted.
Figure 9:
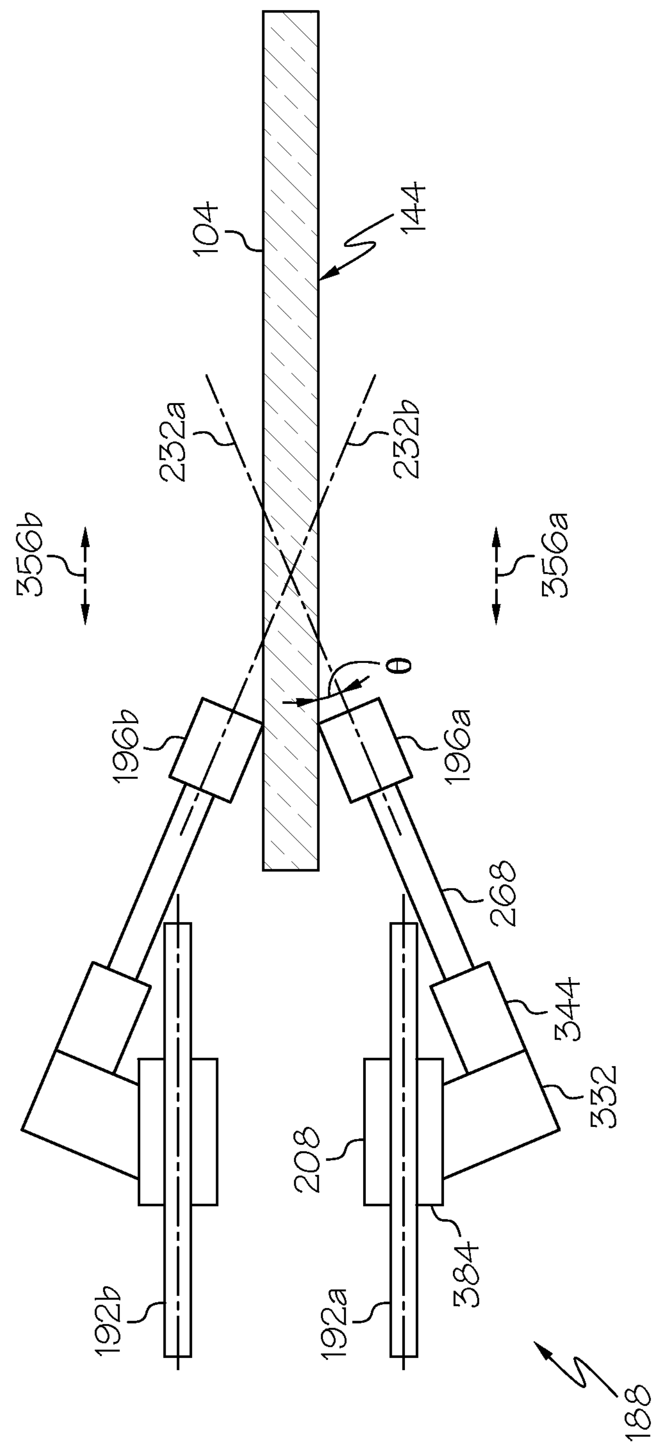
FIG. 9 is a top view of an example glass roll device of FIG. 2 that include roll members that are positively splayed.

Also for example, the axial centerline 232a of the first roll member 196a can be angled with respect to the linear adjustment axis 360a of the first support structure 192a. For example, as shown in FIG. 8, the first roll member 196a can be adjustably attached to the first support structure 192a such that the first linear direction 356a is perpendicular to the draw direction 108, while the axial centerline 232a of the first roll member 196a is vertically down-tilted at an angle α with respect to the draw direction 108, in which case adjustment of the first roll member 196a relative to the first support structure 192a results in translation of the first roll member 196a in the first linear direction 356a while the first roll member 196a is vertically down-tilted, thus providing cross-ribbon tensioning, as described above. Also for example, as shown in FIG. 9, the axial centerline 232a of the first roll member 196a can be positively splayed at an angle θ with respect to the first surface of the glass ribbon 104, e.g. angled positively relative to the first major surface 144 of the glass ribbon 104, while the linear adjustment axis 360a of the first support structure 192a is parallel to the first surface of the glass ribbon 104, in which case adjustment of the first roll member 196a relative to the first support structure 192a results in translation of the first roll member 196a in the first linear direction 356a while the first roll member 196a exhibits positive splay with respect to the first surface of the glass ribbon 104. The angle θ of positive splay can be, for example, 0.005 to 0.3 degrees, 0.01 to 0.2 degrees, or 0.03 to 0.1 degrees. Like for vertical down-tilting, positive splaying of the first roll member 196a, and others, can provide cross-ribbon tensioning, which can improve process stability, product flatness, and/or product stress. Again, a second roll member 196b of the first glass roll device 188, and a first cross roll member 197a and a second cross roll member 197b of a second glass roll device 189, as well as potential additional roll members of these and additional glass roll devices, also can be similarly oriented and adjusted.

Considering the first glass roll device 188 in further detail, as discussed above and as shown in FIG. 1, the glass forming apparatus 100 can further include an adjustment apparatus 384 adjustably attaching the first roll member 196a to the first support structure 192a. The adjustment apparatus 384 can provide for remote adjustment of the position of the first roll member 196a externally, e.g. such that the adjustment apparatus 384 is located external to the fusion forming process enclosure 120, whereas the first roll member 196a is located internal to fusion forming process enclosure 120. Operation of the adjustment apparatus 384 can result in translation of the first roll member 196a relative to the first support structure 192a, directly or indirectly, as described above. Operation of the adjustment apparatus 384 can be carried out remotely, e.g. at a distance from the glass ribbon 104.

As shown in FIG. 4, the adjustment apparatus 384 can include, for example, an adjustment port 392 configured to be externally interfaced with a tool 396 to provide adjustment of the first roll member 196a relative to the first support structure 192a. The tool 396 can provide for operation of the adjustment port 392 in a precise and measured manner, e.g. in an incremental manner, based for example on interfacing gears, grooves, or the like, resulting in adjustment of the first roll member 196a relative to the first support structure 192a also in a precise and measured manner.

As shown in FIG. 2 and FIG. 6, the adjustment apparatus 384 can also include, for example, a tongue 400 slidably received by a groove 404 extending in the first linear direction 356a, e.g. a tongue-in-groove configuration or a dovetail slide configuration, among others. Such a configuration can provide for precise adjustment of the first roll member 196a relative to the first support structure 192a by translation while also minimizing unintended translation and/or pivoting of the first roll member 196a relative to the first support structure 192a and thus relative to the glass forming apparatus 100 and/or the glass ribbon 104.

As shown in FIG. 4, the first glass roll device 188 can also include a measuring device 408 for measuring displacement of the first roll member 196a relative to the first support structure 192a, such as a scale and/or pointer or the like. Measurements of this type can be used, for example, to ensure precise positioning of the first glass roll device 188 relative to the glass ribbon 104, as well as to document fusion process conditions during methods of manufacturing a glass ribbon 104.

As discussed above and as shown in FIG. 6, the first glass roll device 188 can include a second roll member 196b configured to translate relative to the first support structure 192a in the first linear direction 356a. The second roll member 196b also can comprise a glass contact material, can be an internal or external roll member, can be adjustably attached to a second support structure 192b directly or indirectly, similarly to the first roll member 196a as described above. The second roll member 196b also can be configured to be adjusted by translating the second roll member 196b relative to a second support structure 192b in a second linear direction 356b parallel to a linear adjustment axis 360b of the second support structure 192b while the second roll member 196b is adjustably mounted to the second support structure 192b, similarly to the first roll member 196a as described above. As will be appreciated, the second linear direction 356b can be identical to the first linear direction 356a, for example based on the linear adjustment axis 360a of the first support structure 192a and the linear adjustment axis 360b of the second support structure 192b being angled identically with respect to the draw direction 108 of the glass forming apparatus 100 and being parallel to the first surface of the glass ribbon 104. Moreover, to the extent that the second linear direction 356b is identical to the first linear direction 356a, then translation of the second roll member 196b in the second linear direction 356b also can result in translation of the second roll member 196b relative to the first support structure 192a in the first linear direction 356a. As shown in FIG. 9, other configurations, including for example configurations in which the axial centerline 232a of the first roll member 196a and an axial centerline 232b of the second roll member 196b are positively splayed, e.g. with bilateral symmetry, with respect to the first surface of the glass ribbon 104, can also be used.

As noted above and as shown in FIG. 2, the glass forming apparatus 100 also can include a second glass roll device 189. As shown in FIG. 5, the second glass roll device 189 can include a first cross support structure 193a and a first cross roll member 197a adjustably attached to the first cross support structure 193a, wherein the first cross roll member 197a is configured to be adjusted by translating the first cross roll member 197a relative to the first cross support structure 193a in a first cross linear direction 357a parallel to a linear cross adjustment axis 361a of the first cross support structure 193a while the first cross roll member 197*a* is adjustably mounted to the first cross support structure 193*a*, similarly to the first glass roll device 188 as described above. The first cross roll member 197*a* also can be a glass contact material, can be an internal or external roll member, and can be adjustably attached to a first cross support structure 193*a* directly or indirectly, similarly to the first roll member 196*a* as described above. As shown in FIG. 5, in some examples the first cross linear direction 357*a* can be opposite the first linear direction 356*a*, for example based on the linear adjustment axis 360*a* of the first support structure 192*a* and the linear adjustment axis 361*a* of the first cross support structure 193*a* being transverse to the draw direction 108 of the glass forming apparatus 100 and being parallel to the first surface of the glass ribbon 104. Also, as shown in FIG. 7, in some examples the first linear direction 356*a* and the first cross linear direction 357*a* can be vertically downtilted with respect to the draw direction 108, for example based on the linear adjustment axis 360*a* of the first support structure 192*a* and the linear cross adjustment axis 361*a* of the first cross support structure 193*a* both being angled downwardly at an angle α of from about 0.1 degrees to about 10 degrees, such as from about 0.2 degrees to about 5 degrees, such as from about 0.3 degrees to about 3 degrees relative to the transverse of the draw direction 108. In further examples, the axial centerline 232*a* of the first roll member 196*a* and an axial centerline 233*a* of the first cross roll member 197*a* are positively splayed, e.g. with bilateral symmetry, with respect to the first surface of the glass ribbon 104, as discussed above, among other orientations.

Also provided is a method of forming a glass ribbon 104 with a glass forming apparatus 100 including a first glass roll device 188. As shown in FIG. 1, the glass forming apparatus 100 can be configured to form a glass ribbon 104 and draw the glass ribbon 104 in a draw direction 108 as described above. The first glass roll device 188 includes a first support structure 192*a* and a first roll member 196*a* adjustably attached to the first support structure 192*a*, as described above. As shown in FIG. 5, the first roll member 196*a* is configured to be adjusted by translating the first roll member 196*a* relative to the first support structure 192*a* in a first linear direction 356*a* parallel to a linear adjustment axis 360*a* of the first support structure 192*a* while the first roll member 196*a* is adjustably mounted to the first support structure 192*a*, also as described above.

Figure 10:
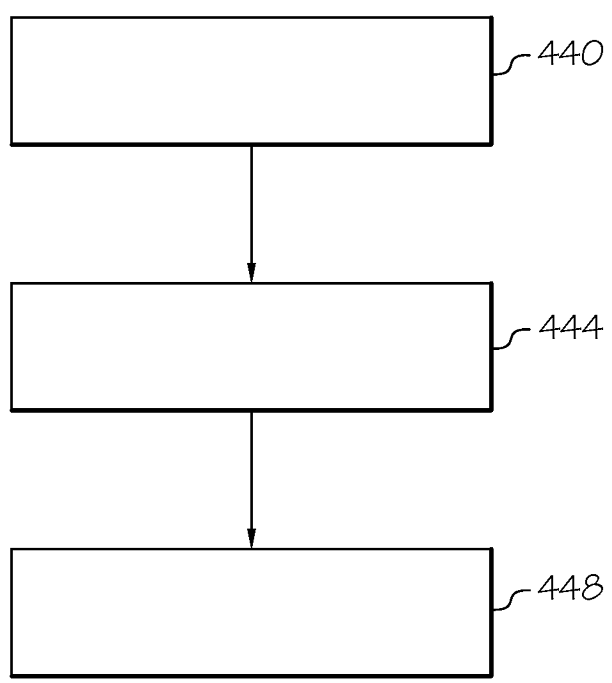
FIG. 10 is a flow chart of a method of forming a glass ribbon with a glass forming apparatus including a first glass roll device as disclosed herein.

Turning to FIG. 10, which provides a flow chart of the method, and with reference to FIG. 1, the method can include a step (I) 440 of drawing the glass ribbon 104 along a draw direction 108 with the glass forming apparatus 100. The glass ribbon 104 can drawn, for example, by the first glass roll device 188, among others, as described above.

With reference to FIG. 5, the method can also include a step (II) 444 of adjusting the first roll member 196*a* relative to the first support structure 192*a* of the first glass roll device 188 by translating the first roll member 196*a* in the first linear direction 356*a* parallel to the linear adjustment axis 360*a* of the first support structure 192*a* while the first roll member 196*a* is adjustably mounted to the first support structure 192*a*. The adjustment can be carried out as described above.

With reference to FIG. 6, the method can also include a step (III) 448 of contacting the first surface of the glass ribbon 104 with the first roll member 196*a* at a first adjusted contact location 456 of the glass ribbon 104. The first adjusted contact location 456 can be, for example, a location distinct from an earlier contact location, to the extent that the first roll member 196*a* has previously contacted the glass ribbon 104 prior to adjustment. The first adjusted contact location 456 also can be, for example, at a first contact surface 172 of the glass ribbon 104, and thus not at a quality area 168 of the glass ribbon 104, as described above.

In accordance with some examples, with reference to FIG. 6, step (III) 448 can contact the first surface comprising a first major surface 144 of the glass ribbon 104, as described above.

Also in accordance with some examples, with reference to FIG. 5, the first linear direction 356*a* can be transverse to the draw direction 108, e.g. based on the linear adjustment axis 360*a* of the first support structure 192*a* being substantially perpendicular to the draw direction 108. Alternatively, with reference to FIG. 7, the first linear direction 356*a* can be vertically down-tilted with respect to the draw direction 108, e.g. based on the linear adjustment axis 360*a* of the first support structure 192*a* being vertically down-tilted with respect to the draw direction 108, e.g. angled at from about 0.1 degrees to about 10 degrees, such as from about 0.2 degrees to about 5 degrees, such as about 0.3 to about 3 degrees relative to the transverse of the draw direction 108.

Also in accordance with the some examples, with reference to FIG. 6, the first glass roll device 188 can also include a second roll member 196*b*, as described above. Moreover, step (II) 444 can include adjusting the second roll member 196*b* relative to the first support structure 192*a* such that the second roll member 196*b* translates relative to the first support structure 192*a* in the first linear direction 356*a*, also as discussed above. In addition, step (III) 448 can include contacting the first surface including a first major surface 144 of the glass ribbon 104 with the first roll member 196*a* and contacting a second major surface 148 of the glass ribbon 104 with the second roll member 196*b*.

Also in accordance with some examples, with reference to FIG. 5, step (I) 440 can include contacting the first surface of the glass ribbon 104 with the first roll member 196*a* at an initial contact location 460 of the glass ribbon 104. The initial contact location 460 can be, for example, an earlier contact location, as discussed above.

In some embodiments of this example, with reference to FIG. 5, step (II) 444 can include continuously contacting the first surface of the glass ribbon 104 with the first roll member 196*a* while translating the first roll member 196*a* along the first linear direction 356*a* from a first orientation wherein the first roll member 196*a* contacts the initial contact location 460 to a second orientation wherein the first roll member 196*a* contacts the first adjusted contact location 456. For example, to the extent that the first linear direction 356*a* is perpendicular to the draw direction 108, step (II) 444 can include continuously contacting the first surface of the glass ribbon 104 with the first roll member 196*a* while translating the first roll member 196*a* perpendicular to the draw direction 108, e.g. toward or away from a centerline 464 of the glass ribbon 104 along the draw direction 108. Also for example, with reference to FIG. 7, to the extent that the first linear direction 356*a* is vertically down-tilted with respect to the draw direction 108, step (II) 444 can include continuously contacting the first surface of the glass ribbon 104 with the first roll member 196*a* while translating the first roll member 196*a* vertically down-tilted with respect to the draw direction 108, again e.g. toward or away from a centerline 464 of the glass ribbon 104 along the draw direction 108.

Also in accordance with some examples, the glass ribbon 104 is being drawn continuously during steps (I) 440, (II) 444, and (III) 448. In this way, the adjustment of the first roll member 196*a* relative to the first support structure 192*a* can be carried out with minimal disruption to the overall process for manufacturing the glass ribbon 104. For example, the glass ribbon 104 can be drawn by the first glass roll device 188 to the extent that step (II) 444 includes continuously contacting the first surface of the glass ribbon 104 with the first roll member 196*a* while translating the first roll member 196*a*. Also for example, the glass ribbon 104 alternatively or additionally can be drawn continuously by other glass roll devices during the steps.

Also in accordance with some examples, with reference to FIG. 2, the first roll member 196*a* can include a driven roll member 336, and step (III) 448 can include stretching the glass ribbon 104 with the driven roll member 336 to reduce a thickness 146 of the glass ribbon 104, as described above.

Also in accordance with some examples, with reference to FIG. 4, the first roll member 196*a* can include an idle roll member 342, and step (III) can include pinching the glass ribbon 104 at an edge bead 180 of the glass ribbon 104 with the idle roll member 342, also as described above.

Also in accordance with some examples, with reference to FIG. 5, step (II) 444 can include linearly sliding the first roll member 196*a* relative to the first support structure 192*a*, as described above.

Also in accordance with some examples, with reference to FIG. 5, the glass forming apparatus 100 can include a second glass roll device 189, as described above. Moreover, step (II) 444 can include adjusting a first cross roll member 197*a* relative to a first cross support structure 193*a* of the second glass roll device 189 by translating the first cross roll member 197*a* in a first cross linear direction 357*a* parallel to a linear cross adjustment axis 361*a* of the first cross support structure 193*a* while the first cross roll member 197*a* is adjustably mounted to the first cross support structure 193*a*, as described above. In addition, step (III) 448 can further include contacting the first surface of the glass ribbon 104 with the first cross roll member 197*a* at a first cross adjusted contact location 457 of the glass ribbon 104.

The first cross adjusted contact location 457 also can be, for example, a location distinct from an earlier contact location, to the extent that the first cross roll member 197*a* has previously contacted the glass ribbon 104 prior to adjustment. The first cross adjusted contact location 457 also can be, for example, at a second contact surface 176 of the glass ribbon 104, opposite the first contact surface 172, and thus not at a quality area 168 of the glass ribbon 104, as described above.

In some embodiments of this example, with reference to FIG. 5, the first cross linear direction 357*a* can be opposite the first linear direction 356*a*, for example based on the linear adjustment axis 360*a* of the first support structure 192*a* and the linear cross adjustment axis 361*a* of the first cross support structure 193*a* being transverse to the draw direction 108 of the glass forming apparatus 100 and being parallel to the first surface of the glass ribbon 104, as discussed above.

Also in some embodiments of this example, with reference to FIG. 7, the first linear direction 356*a* and the first cross linear direction 357*a* can be vertically downtilted with respect to the draw direction 108, for example based on the linear adjustment axis 360*a* of the first support structure 192*a* and the linear cross adjustment axis 361*a* of the first cross support structure 193*a* being angled downwardly at an angle $\alpha$ of from about 0.1 degrees to about 10 degrees, such as from about 0.2 degrees to about 5 degrees, such as from about 0.3 degrees to about 3 degrees relative to the transverse of the draw direction 108.

The glass forming apparatus and methods disclosed herein can be used to adjust contact locations of glass roll members with minimal downtime, process disruption, and cost. Moreover, costs to recover roll members are decreased because, for example, relatively less glass contact material is replaced upon change of roll members. In addition, size and cost of inventories of replacement roll members are decreased. Furthermore, the glass forming apparatus and methods should enable more rapid response to changes in process conditions, resulting in improved product performance with respect to stress and shape. Further still, use of roll members and/or support shafts that will not overhang any portion of the glass ribbon distal to the respective contact location of the glass ribbon should reduce thermal effects in and/or near the quality area of glass ribbons, decreasing the likelihood of occurrence of undesirable stress and polarization features in resulting products.

It will be apparent to those skilled in the art that various modifications and variations can be made to the described embodiments without departing from the spirit and scope of the claimed invention. Thus, it is intended that the present claimed invention cover the modifications and variations of the embodiments described herein provided they come within the scope of the appended claims and their equivalents.

What is claimed is:

1. A method of forming a glass ribbon with a glass forming apparatus comprising a first glass roll device, the method comprising the steps of:

(I) drawing the glass ribbon along a draw direction with the glass forming apparatus;

(II) adjusting a first roll member relative to a first support structure of the first glass roll device by translating the first roll member in a first linear direction parallel to a linear adjustment axis of the first support structure while the first roll member is adjustably mounted to the first support structure, wherein the first linear direction is vertically down-tilted with respect to the draw direction; and (III) contacting a first surface of the glass ribbon with the first roll member at a first adjusted contact location of the glass ribbon.

2. The method of claim 1, wherein step (III) contacts the first surface comprising a first major surface of the glass ribbon.

3. The method of claim 1, wherein the first glass roll device comprises a second roll member, step (II) comprises adjusting the second roll member relative to the first support structure such that the second roll member translates relative to the first support structure in the first linear direction, and step (III) comprises contacting the first surface comprising a first major surface of the glass ribbon with the first roll member and contacting a second major surface of the glass ribbon with the second roll member.

4. The method of claim 1, wherein steps (II) and (III) comprise continuously contacting the first surface of the glass ribbon with the first roll member while translating the first roll member along the first linear direction from a first orientation wherein the first roll member contacts the initial contact location to a second orientation wherein the first roll member contacts the first adjusted contact location.

5. The method of claim 1, wherein the glass ribbon is being drawn continuously during steps (I), (II), and (III).

6. The method of claim 1, wherein the first roll member comprises a driven roll member, and step (III) comprises stretching the glass ribbon with the driven roll member to reduce a thickness of the glass ribbon.

7. The method of claim 1, wherein the first roll member comprises an idle roll member, and step (III) comprises pinching the glass ribbon at an edge bead of the glass ribbon with the idle roll member.

8. The method of claim 1, wherein step (II) comprises linearly sliding the first roll member relative to the first support structure.

9. The method of claim 1, wherein the glass forming apparatus comprises a second glass roll device, step (II) comprises adjusting a first cross roll member relative to a first cross support structure of the second glass roll device by translating the first cross roll member in a first cross linear direction parallel to a linear cross adjustment axis of the first cross support structure while the first cross roll member is adjustably mounted to the first cross support structure; and step (III) further comprises contacting the first surface of the glass ribbon with the first cross roll member at a first cross adjusted contact location of the glass ribbon.

* * * * *